United States Patent
Gobeli et al.

[11] Patent Number: 5,999,666
[45] Date of Patent: Dec. 7, 1999

[54] DEVICE AND METHOD FOR OPTICAL SCANNING OF TEXT

[76] Inventors: Garth W. Gobeli; Jean S. Gobeli, both of 1004 Warm Sands Trl., SE., Albuquerque, N. Mex. 87123-4335

[21] Appl. No.: 08/926,424

[22] Filed: Sep. 9, 1997

[51] Int. Cl.[6] .................................................. G06K 9/22
[52] U.S. Cl. ...................... 382/313; 382/314; 358/473; 358/484
[58] Field of Search .................................. 382/313, 314, 382/312–315; 358/473, 474, 497, 484

[56] References Cited

U.S. PATENT DOCUMENTS

| | | | |
|---|---|---|---|
| 3,918,028 | 11/1975 | Humphrey et al. | 340/146.3 |
| 3,947,817 | 3/1976 | Requa et al. | 340/146.3 |
| 4,158,194 | 6/1979 | Mc Waters et al. | 340/146.3 |
| 4,797,544 | 1/1989 | Montgomery et al. | 250/221 |
| 4,817,185 | 3/1989 | Yamiguchi et al. | 382/59 |
| 4,947,261 | 8/1990 | Ishikawa et al. | 358/473 |
| 5,012,349 | 4/1991 | de Fay | 358/296 |
| 5,023,922 | 6/1991 | Abramovitz et al. | 382/313 |
| 5,083,218 | 1/1992 | Takasu et al. | 358/473 |
| 5,142,161 | 8/1992 | Brackman | 250/566 |
| 5,175,422 | 12/1992 | Koizumi et al. | 235/472 |
| 5,256,866 | 10/1993 | Conversano et al. | 235/472 |
| 5,301,243 | 4/1994 | Olschafskie et al. | 382/59 |
| 5,430,558 | 7/1995 | Sohaei et al. | 358/473 |
| 5,506,394 | 4/1996 | Plesko | 235/472 |
| 5,574,804 | 11/1996 | Olschafskie et al. | 382/313 |
| 5,595,445 | 1/1997 | Bobry | 400/88 |
| 5,638,466 | 6/1997 | Rokusek | 382/290 |

*Primary Examiner*—Phuoc Tran

[57] ABSTRACT

A small hand-held optical scanning device for the accurate and precise scanning of lines of text characters is described. The scanner does not require any mechanical means of providing tachometer-like or encoder-like scanning signals in order to establish an accurate reproduction of the scanned text. An auxiliary single element detector samples the scanned text at an advanced (retarded) position relative to the main one dimensional scanner of the device. This advanced detector sensor, together with appropriate and disclosed software algorithms, permits the accurate correction of baseline imperfections as well as corrections for scan-speed non-uniformities and basic scan-speed errors. The processed scanner output is sufficiently faithful to the scanned text that optical character recognition (OCR) software can precisely interpret the scanned images and subsequently provide an accurate ASCII representation of the scanned text. Arbitrary characters, such as Kanji symbols, can be scanned accurately, which also permits the application of optical character recognition (OCR) software which is dedicated to such text characters.

8 Claims, 5 Drawing Sheets

DEVICE AND METHOD FOR OPTICAL SCANNING OF TEXT

BACKGROUND

1. Field of Invention

This invention relates to optical scanners, and more specifically to devices that are designed to scan single lines of text characters.

2. Description of Prior Art

Early patents in the field of optical scanners that were designed for scanning single lines of text either addressed the use of two dimensional imaging detectors or did not discuss the problem of scan speed or speed uniformity when a one dimensional scan detector array was employed.

Scanners employing two dimensional array detectors are disclosed in U.S. Pat. Nos. 4,817,185 by Yamiguchi et.al, 4,158,194 by McWaters et.al., and, 3,947,817 by Requa (deceased) et.al.

One dimensional array "free running" scanners are disclosed in U.S. Pat. Nos. 5,256,866 by Conversano et.al, and, 4,497,261 by Ishikawa et.al. As discussed below these patents do not address the situation of accurately reproducing the text image in a computer.

With the development of sophisticated optical character recognition (OCR) software the necessity of having an accurate image reproduction of the scanned text became apparent; i.e. the image of the text had to have the proper aspect ratio in order that the OCR software could function efficiently (aspect ratio is the ratio of the text height to the text width). If the aspect ratio was not precisely represented in the stored image of the text, then the OCR would be unable to accurately recognize a large percentage of the scanned characters, leaving an unacceptable number of characters to be manually processed.

With this insight concerning OCR software limitations, the next generation of text scanners, which employed one dimensional linear detector arrays that were to be linearly scanned along a line of text, employ an independent wheel or ball to roll along the surface of the document being scanned. This wheel is employed to provide tachometer-like information so that the detector array could be commanded to scan the document at preset and rigidly uniform distances along the line of text. Thus, for example, a scan could be initiated every 1/300 of an inch and the resultant text image would have an image resolution of 300 dots per inch (provided that the detector array had such resolution itself). This action is variously described as "tachometer", "synchronized", "commanded", or "encoded" scanning methodologies. Such scanner devices are disclosed in U.S. Pat. Nos. 5,595,445 by Bobry, 5,301,243 and 5,574,804 by Olschafskie et.al, 5,430,558 by Sohaei et.al, 5,175,422 by Koizumi et.al., 5,083,218 by Takasu et.al, 5,012,349 by deFay, and 4,797,544 by Montgomery et.al. One of the major problems with such encoder devices is that it is difficult to ensure that they track along the substrate, that is, the surface upon which the text characters reside, in a reliable and reproducible manner, i.e. they frequently slip or skip along the substrate and thereby fail to reliably reproduce an accurate text image. Also, continued use tends to produce a "dirty" encoder wheel/ball mechanism due to pick up of debris from the substrate. This requires continued attention and cleaning in order to provide an accurate encoding system. These are significant problems that are circumvented by this disclosure.

Of these patents, those by Olfschafski et.al. (U.S. Pat. Nos. 5,301,243 and 5,574,804) describe the most compact of such devices in that the described scanner is pen-shaped and pen-sized. It retains a small ball shaped roller in the scanner nose piece which is employed as a scan encoder. That the encoder mechanical components are so small means that the problems of failure to track accurately and debris dirtying of the mechanism will be more of a problem for this device than for the other, larger systems.

One of the primary claims in the Olschafskie et.al. patents is for a scanner which has a transparent nose piece that permits intimate observation of the text being scanned and thus permits more precise scanning.

An additional problem which is present in "free hand" scanning is that the scanner is generally not precisely aligned with the baseline of the text being scanned. This is known as baseline "skew". Additionally, the scan baseline is usually not a straight line, but rather is curved or wavy.

One approach to compensating for both of these problems is addressed in U.S. Pat. No. 5,638,466 by Rokusek. The approach disclosed in this patent is very careful and is quite complex in application. In our work we discuss a relatively much simpler methodology for baseline corrections that prove quite adequate for the situation in which text of a known (or readily determined) height is being scanned.

OBJECTS AND ADVANTAGES

The scanner device disclosed herein does not employ a mechanical synchronizing device during it's scanning action. It achieves the accurate image of a line of text characters that is necessary for the application of OCR software in a different, non-mechanical manner. It employs a single detector element which scans the text characters near a midpoint position (defined as the point midway between the font "baseline" and "heightline" as established by the set of the thirteen lower case letters a, c, e, m, n, o, r, s, u, v, w, x, and z). This detector element samples the scanned text at an accurately predetermined distance in front of (or behind) the one dimensional detector array. In practice this "single detector element" can be one of the main detector array elements, specifically, one of the elements at the beginning or at the end of the array. Thus, in the scanned image, the lead/lag detector element scans exactly the same vertical text character position as does a specific element in the main scanner detector array. This array element is designated as the "corresponding element" of the scanner main detector array. A computer software algorithm is then used for establishing the proper text image aspect ratio.

Thus, the integration of the advanced/retarded detector element together with the appropriate software algorithms produces a scanner which is properly described as an "electronic highlighter".

By knowing the density of detector elements along the array it is possible to precisely determine the proper number of scans required in that small distance, defined by the spatial separation between the advanced detector element and the corresponding element of the main scanning array, in order to produce an exact representation of the scanned text. The array, including the additional detector element, is scanned at the array's maximum scan rate, which fixed rate also serves as the system clock. The number of scans which are performed in the time interval between the detection of a character leading edge by the advanced (retarded) element and the corresponding registered array element is determined simply by counting the number of scans. By comparing that number to the "required" number of scans as discussed above one can then determine how many scans must be deleted from that scanned image and also which specific scans should be deleted, in order to reproduce a precisely accurate image of the text. Alternatively, if too few scans are produced, the appropriate number of scans can be added to "pad" the image in order to provide accurate text reproduction. Thus the individual scans are added/deleted proportionately throughout the particular segment of the scan so that the image is not distorted.

For example: with an array having 128 elements in a 0.25 inch length and a detector lead element spaced 0.125 inch in front of the main array, an accurate image would require 64 scans spaced uniformly to reproduce a text character (assuming 1:1 imaging onto the detector). If, for example, one detected 128 scans, then every other scan would be deleted from the image file. If only 32 scans were detected then each individual scan would be reproduced one additional time to form the image.

We have employed a 128 element photodiode array (Texas Instruments #TSL-412) which scans at a rate of 2.0 MHz. This array, thus, will provide a complete 128 element scan at a rate of 2,000,000/128=15,625 scans per second. The vertical resolution of the array is 128/0.25=512 elements per inch and to achieve this horizontal resolution at the maximum scan rate, the scan speed should be 30 inches per second (a very fast scan speed for a hand held scanner). Therefore, for the anticipated case of slower scan speeds, the aspect ratio reproduction problem will center on the proper elimination of scans with an appropriate methodology.

A detailed discussion of the scanning pen prototype, the electronics employed, and the software programs already developed will be given below. A discussion of the additional hardware and software yet to be developed is also given.

SUMMARY

A compact hand-held and hand-guided device is described which employs a one dimensional linear scanning array as the main scanning element. This array provides a series of vertical "slices" or samples of the text being scanned. A secondary single detector element, which may or may not be an element of the main scanning array, simultaneously samples the text at a predetermined vertical and horizontal position relative to the main scanner detector array. This action provides a means of establishing the appropriate spatial accurate representation of the scanned character, via specialized computer algorithms which have been developed, so that the application of optical character recognition (OCR) software can provide a precise interpretation of the scanner output.

DETAILED DESCRIPTION OF THE PREFERRED EMBODIMENTS

The invention provides a simple, light, compact, and inexpensive hand-held scanner for note taking, excerpting text, reference citing, etc. The scanner can take the shape of a pen or of a palm controlled device similar to a computer mouse. The information to be scanned can be acquired from printed sources such as books, magazines, newspapers, etc. All or a portion of lines of text of arbitrary (within reason) lengths can be scanned. Following the scanning action, a computer algorithm (to be described) corrects the baseline variations of the scanned text and then corrects for distortions due to uneven scanning speed. The processed text is then subjected to a standard optical character recognition (OCR) analytical program and the scanned text is thus converted from a bitmapped image to ASCII character codes, thereby providing a vast savings in computer memory for a given amount of text.

Figure 1:
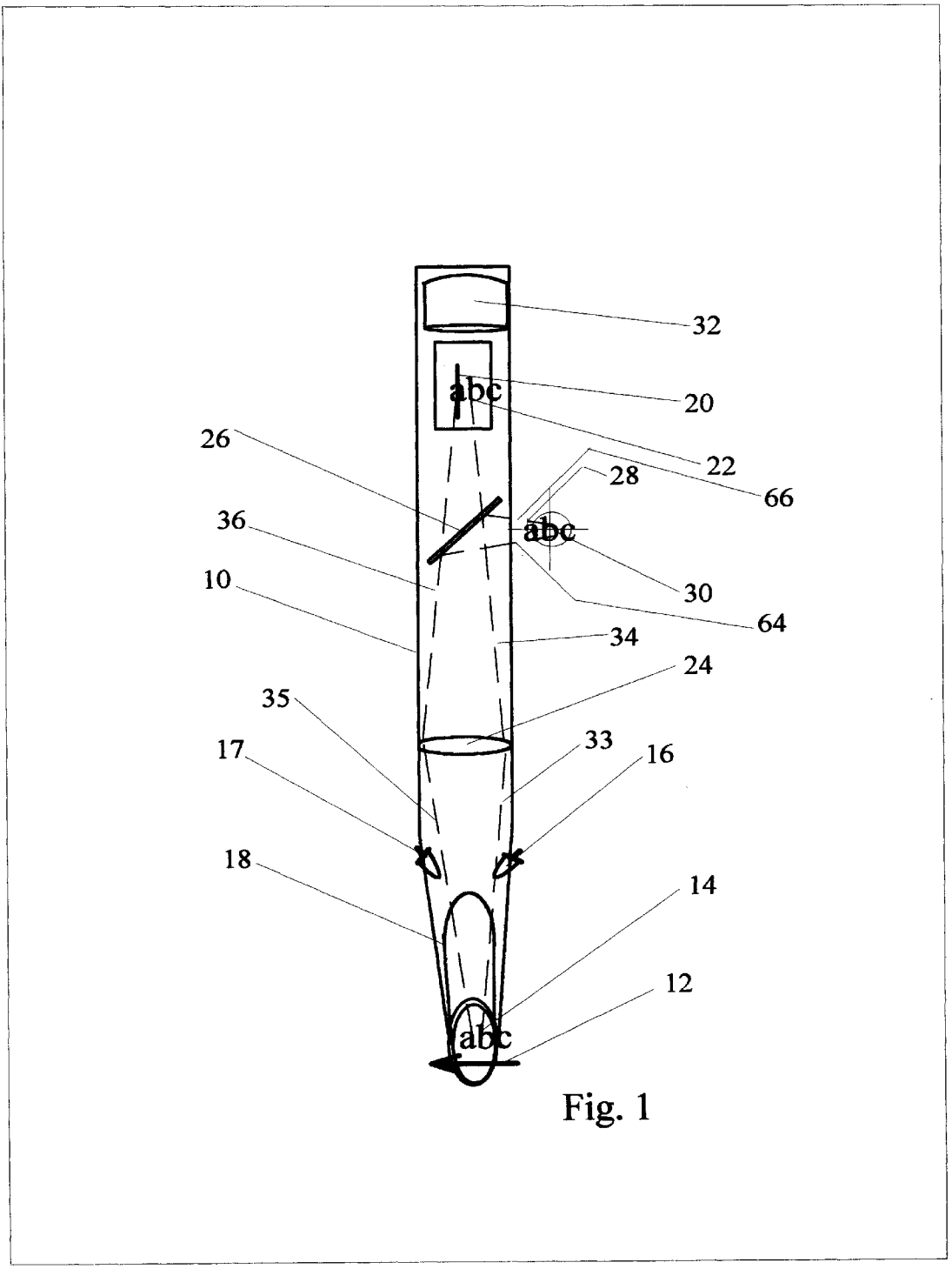
FIG. 1 is a cut away view of the scanner pen showing the working parts at a first point during a scan of a text set.

As indicated in FIG. 1, the scanner 10 is stroked along a line of text so that each character is in turn is partially in the field of view of the linear scanning array 20. In this manner the fully scanned image provides a succession of vertical slices of each character of the text. Each slice of the text character is stored as a 1×N record (in our case a 1×128 record). After the raw scanned image is stored, a computer algorithm corrects for uneven or skewed baseline and for uneven and/or incorrect scan speed across the page. Then an OCR program converts the corrected scanned image into ASCII text codes for final storage and utilization.

Referring now to FIG. 1, a scanpen 10 of the present invention is represented in a cut away view. The scanpen is stroked is a direction 12 along a set of text characters 14. The text characters on the printed page are illuminated by a set of light emitting diodes (LEDs) 16 or some other bright light source such as incandescent or fluorescent lamps or laser diodes, etc. If necessary and/or appropriate, the illumination produced by these light sources can be enhanced and made uniform by the presence of a metallic reflecting insert surface (polished aluminum) 18 placed inside the scanpen nose piece.

An image of the text 22 is formed in the plane of the linear scanning detector element 20 by lens 24. Dotted lines 33, 34, 35 and 36 indicate the extent of the optical path that forms the image on the detector face.

A beam splitter 26 is placed at an intermediate position between lens 24 and the linear detector 20. This causes a secondary image 28 of the text to be formed (in the illustrated case) at a right angle to the primary image 22 which is itself focused onto linear detector array 20. A single discrete detector element 30 is positioned in this image plane so that it detects a position in the scanned text which is advanced (or retarded if appropriate) relative to the primary image position on detector array 20. Dotted lines 64 and 66 indicate the extent of the optical path that forms the image onto detector 30. This advanced position is predetermined by fabrication of the scanpen, and in the example cited in the summary it is set at 0.125 inches although obviously any appropriate value may be selected.

As illustrated in FIG. 1, the detector array 20 is shown as scanning a slice of the character "a" while the discrete detector 30 is shown as detecting a position in the character "b" which is yet to be imaged onto the detector array 20. Electronic package 32 performs the function of clocking the array scanning and conditioning the output for presentation to a computer.

One alternative to this approach would be to replace the single element detector 30 with a second linear array, similar to the main detector array 20, which is oriented at the position of detector 30 so as to provide a horizontal slice of the text being scanned. This arrangement would permit additional flexibility in the leading detector element positioning aspect of the scanner.

Figure 2:
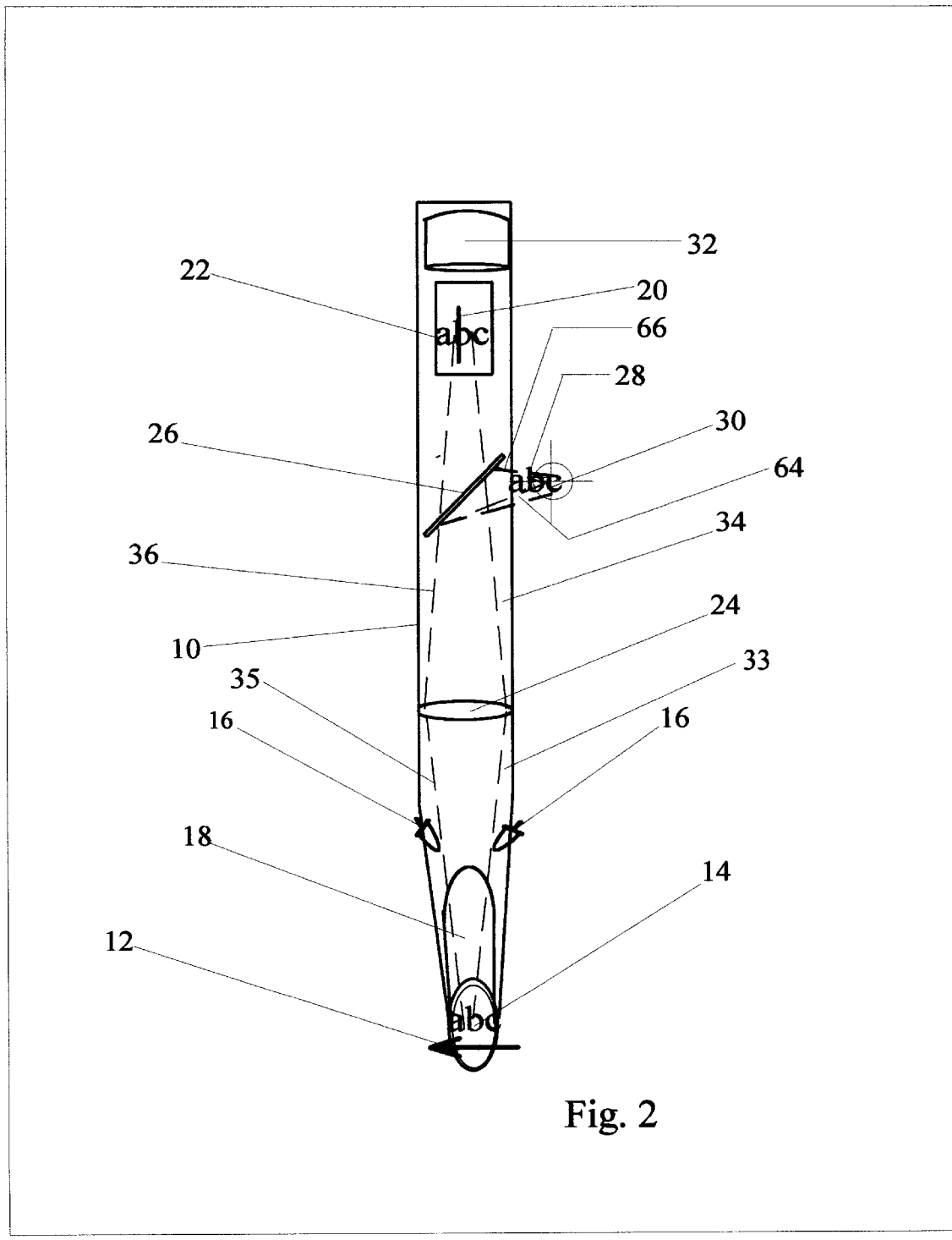
FIG. 2 is the same cut away view of the scanner pen showing the scan at a later part of the scan of text characters.

FIG. 2 shows the same view as FIG. 1, but now with the scan of text having been advanced. In this case the primary image is positioned with the letter "b" focused onto array 20 while the letter "c" has advanced into position on discrete detector element 30.

Therefore the detection of the position of letter "b" is produced onto detector 30 earlier in the scan than is the detection of "b" by the primary linear array 20. For the case cited, this detection at the discrete detector 30 occurs precisely 0.125 inches in front of the corresponding image position on detector array 20. Since the detector array 20 is scanned at a constant rate, in the case of our working device at 15,635 complete scans per second, it is possible to determine the exact number of scans of array 20 that occurred between the detection of the leading edge of character "b" by the discrete detector 30 and the corresponding leading edge of the character "b" by the particular array element of detector array 20 that is in horizontal resolution with the discrete detector 30. In the scanpen that we assembled we found that the appropriate corresponding array element of array 20 was element number 58 out of the set of 128.

Since the array dimensions dictated that 64 scans were required to form a exact image of the text being scanned for the scanpen that has been fabricated and tested, the comparison of the experimentally encountered number of scans to the required 64 scans, permits the development of a computer algorithm which will eliminate scans on a distributed basis so that the exact spatial representation of the scanned text can be produced.

Thus the advanced/retarded single detector element, together with appropriate processing by a computer fulfills the equivalent role of the earlier described rotating and tracking "tachometer", "synchronizer", or "encoder" wheels or balls. I shall designate the function of this detector/computer algorithm as the "virtual encoder" or "VE".

Figure 3:
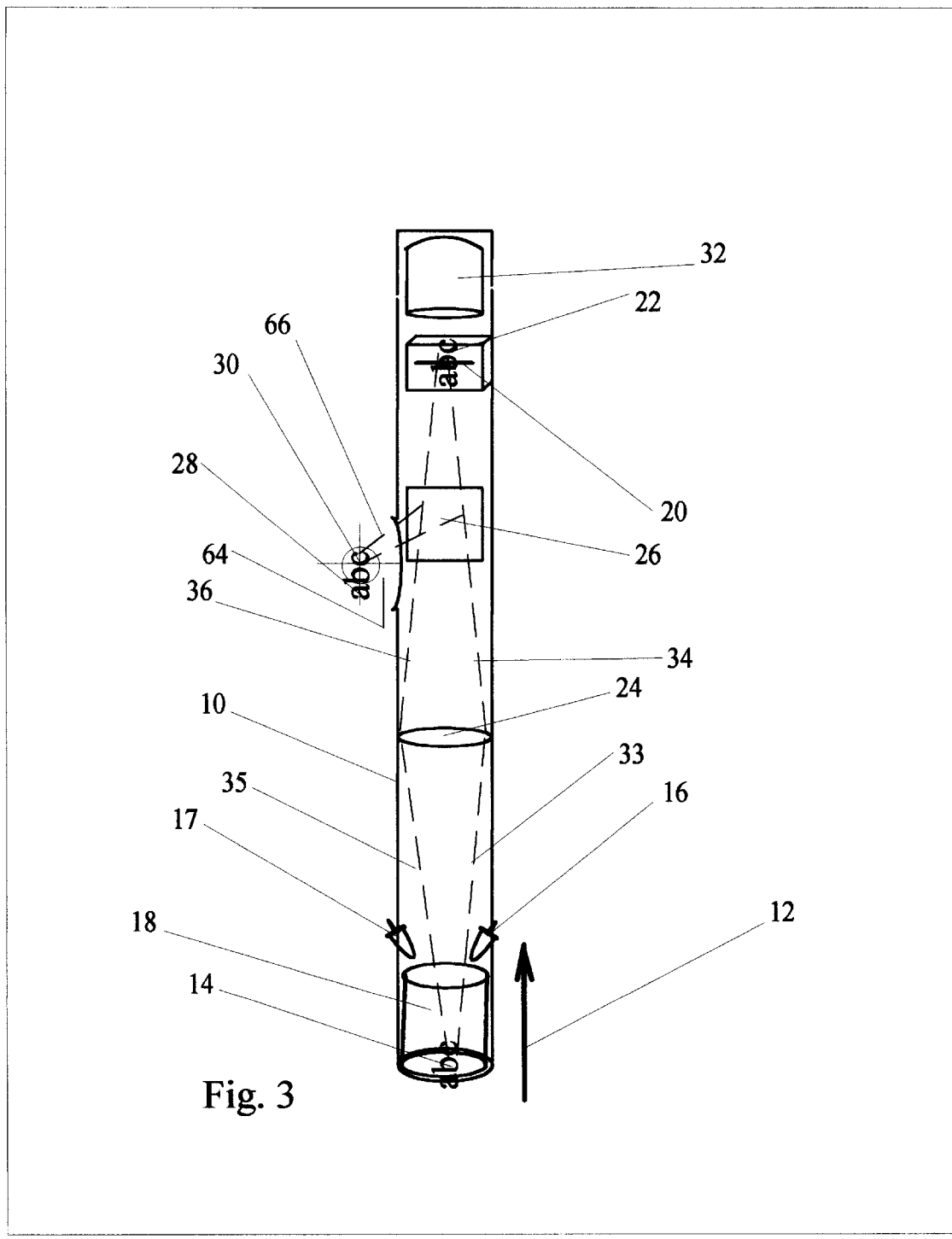
FIG. 3 is a cut away view of the scanner pen form a view taken at approximately 90 degrees from that shown in FIG. 1 and FIG. 2.

FIG. 3 shows another cut away view of the scanpen, taken in the direction orthogonal to those of FIG. 1 and FIG. 2. It further clarifies the relationship between the "advanced detector" element 30 and the corresponding element of the main scanning array 20.

Figure 4:
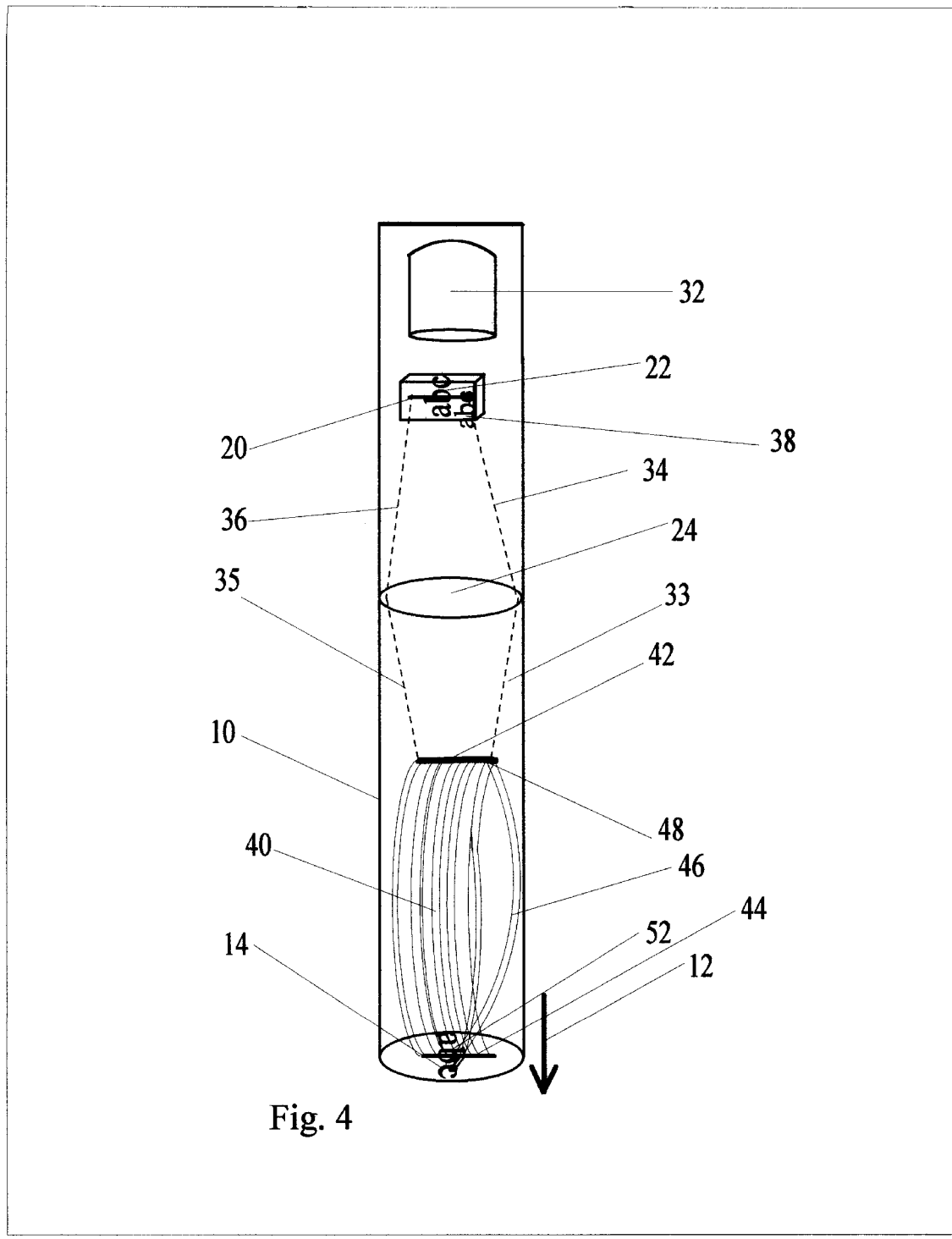
FIG. 4 shows an alternate manner of coupling a leading (trailing) text element to the first element of the scan array or to a separate single detector element.

FIG. 4 shows another methodology for providing the VE function. In this embodiment, a flat bundle of optical fibers 40 provides an object plane 42 at its upper surface which is in turn imaged onto the linear detector array 20. This upper surface if formed into a linear array of fibers, each of which has a diameter of about 50 micrometers (0.002" or about 500 elements per linear inch). Thus 128 of them provide a linear array of some 0.25" in length, which dimension is an excellent match to the linear detector array currently being employed as the scanning detector. If appropriate, a larger or smaller fiber bundle could be fabricated in order to contact a longer or shorter scanning array.

If it were possible to bring the upper face 42 of bundle 40 into direct and intimate contact with array 20 then such imaging lens 24 would be unnecessary. However, commercially available arrays posses an encapsulating window of thickness such that such direct contact of a fiber bundle to this window cannot produce an image on the array of adequate resolution. In the future, arrays could be fabricated that either permit direct contact by such fiber linear bundles or said arrays could be fabricated with sufficiently thin protective windows that direct contact would provide for the necessary spatial resolution on the array. It is possible, however, that a very sophisticated computer analysis of the resultant scanned image might derive useful information.

One major key point of this embodiment lies in the fact that the lower face 44 of the fiber bundle has been modified so that a few (one to four) of the fibers 46 from one edge of the bundle 40 have been rerouted so that it (they) are positioned in the object plane next to the text 14 being scanned in a position precisely located a known distance in front of the main body of the bundle 40. This then provides a VE element which is registered with a particular element of the main array 20 and positioned a known and predetermined distance before (after) the main array fiber system 40. Also, the VE output is registered onto the edge element(s) of the main array and thus automatically shares the gain parameters of the array as well as eliminating some circuitry and programming necessitated by the existence of an independent single element detector to provide the VE function. As indicated, the leading aspect of this set of few fibers effectively produces an advanced image 38 of the text being scanned upon the corresponding few detector elements at one end of the main scanning array.

Figure 5:
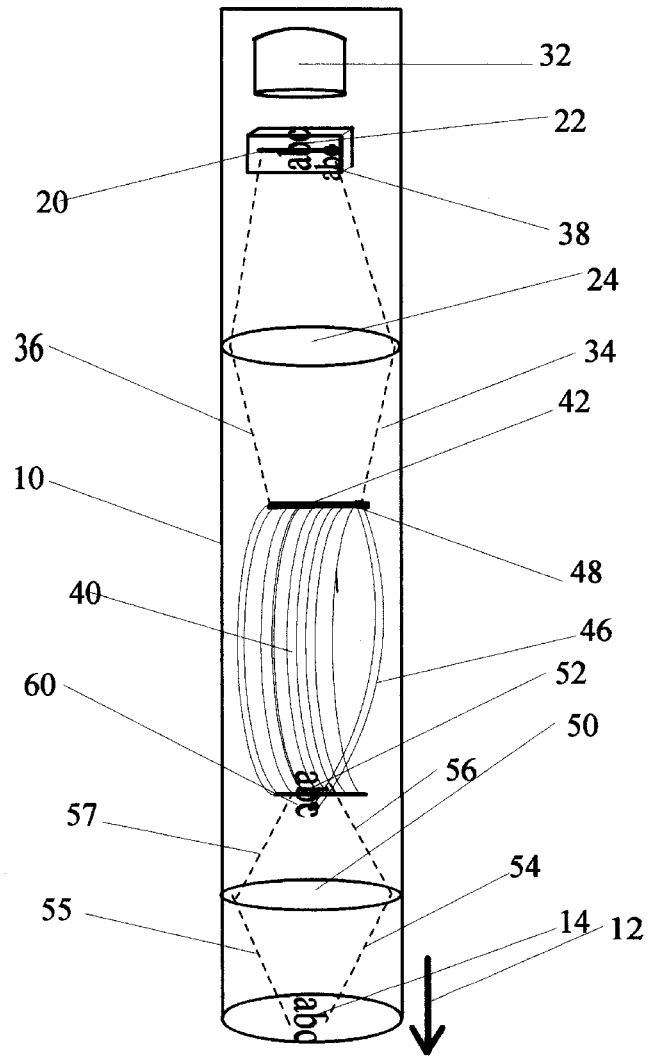
FIG. 5 shows yet another method of bringing the scanned text and the leading text element to a single discrete detector or to the first element of the scanning array.

An additional embodiment of the scanning device is presented in FIG. 5. This embodiment derives in part from that of FIG. 4 which is discussed above. In this embodiment, a linearly registered fiber array 40 is now positioned so that its input face 44 is positioned remotely from the surface being scanned. Now, text 14 is imaged onto the input (lower) face of the fiber bundle 40 which is again configured such that the lower or input face 44 possesses the advanced VE configuration described above relative to FIG. 4. An additional lens 50 positioned at an intermediate position between text element 14 and fiber bundle input face 44 images said text onto the plane of the fiber bundle input face. This embodiment thus places the bundle input face at a remote position from the substrate surface being scanned and thus precludes any possible pick up of surface debris which might contaminate scanned images for the case of elements which might contact the scanned surface. Dotted lines 54, 55, 56, and 57 indicate the extent of the optical path that forms the image onto the fiber bundle input face.

At this point the data set derived from the scanpen consists of a set of scan slices of the text, each slice being 128 individual "pixel" elements, plus a single detector output from the advanced element 30. The complete data set is comprised of an indeterminate number of such scans, but for purposes of estimation, if the scans occur on an average of 1000 scans per linear inch of text and the line of text is 6 inches overall, then the record will be some 6000 sets of the (128+1) detector outputs.

In order to make the data files more manageable it was decided to replace the output of scan array detector element #1 with the output of the discrete detector, the virtual encoder, 30. Thus the file is reduced to a 128×N array.

The first part of the data processing is to replace a 128 byte single scan file by a 16 byte file in which each pixel of the scanning array is represented by a single pixel in a byte; i.e. a byte now represents the output of 8 elements of the array. This is possible since the only useful information contained per element in the output of the array is either a "0" which represents the presence of light reflected from the text or a "1" which represents the absence of light. Thus a "0" represents white on the paper while "1" represents black. Since the plotting to the screen is a bitmap function (as is the OCR processing), this method of data representation is both effective and efficient in memory usage.

Following this straightforward conversion of the data, the next problem to be addressed is the baseline correction.

Correction must be made for skewness of the scanned image which is evidenced by a continual slanting of the baseline as a function of distance into the scan. Correction for the non-linearity of scan must also be made. A curved or wavy baseline must be accounted for and all text characters displayed relative to a single horizontal baseline.

The baseline correction algorithm employed here is given below in narrative format. It is clear that numerous other algorithms could be developed if the information available from the VE system is incorporated.

First:

For any given font style, there are only 5 characters which have text elements which descend below the fundamental baseline of the text. Such characters are known as "descenders". They are the lower case letters g, j, p, q, and y. There are 9 characters which have the property of text elements which lie above the fundamental text height line. They are the lower case letters b, d, f, i, j, k, l, and t (i and j are included by their possession of the dot above the character). These characters are known as "ascenders". Capital letters and numerals share the text height of the ascender set of lower case letters. The remaining 13 lower case characters a, c, e, m, n, o, r, s, u, v, w, x, and z establish the fundamental text "height" in that the lower edge of these characters form a "baseline" for the text (which is common with the ascender class of characters) and the upper edge of the character set form the "heightline" for the font in that all of the characters share a common upper value. The length below the baseline of the descending portion of descender characters is between 35% and 39% of the fundamental text height (we will use 37%). Also the height of ascenders, capital letters and numerals is 137% of the fundamental text height. For the case that the text is all capitals, this font height analysis is not necessary.

Second:

Baseline correction or compensation is established by the following scanner/software procedures:

When the scanner is first to be employed on a series of text lines, it is placed into a "calibrate" mode by a software switch. Then a representative line of the text is scanned. The scanned image is examined by the specialized software algorithm which determines the fundamental text height. This is done by determining the highest and lowest scanner element addresses which are "1"s; i.e. the extent of black elements is determined within each text character. The extent of text characters is established by locating a series of scans which contain no black elements. That is scans which have black elements are grouped between series scans which have only white spaces. In the case of text characters which are occasionally connected, then the identified "character" may well consist of two or more true text characters. The computer will thus establish two fundamental heights of the scanned text. The larger value will be associated with ascenders, descenders, capital letters and numerals. The smaller value will be associated with the 13 lower case "fundamental text height" characters. This value is stored in memory for future reference.

Third:

The scanner is then switched into the "scan" mode and a scan is initiated. A baseline for the text is established after completion of one line of scanned text by locating the nearly constant lower address of text characters (abrupt downward changes of 25% or more of the stored text height are deleted from consideration). The baseline value observed at the beginning of the text is noted and any small changes (less than 28% of the text height) in text baseline are corrected to the initial value by shifting the scanner element values up or down by the detected difference amount.

Whenever a "descender" is noted and identified (change in apparent baseline by more than 28% downward) the program notes the beginning scan number of that character and includes that character into the baseline correction noted for the next succeeding baseline correction procedure thereby including the descender.

This program thus produces a bitmapped image of the text which now resides on a completely flat horizontal baseline. Again, note that other algorithms can produce this same result if the algorithms are presented with the scanned text slices and the synchronized output of the virtual encoder.

The text image must now be corrected for non uniformity of scan stroke as well as the basic error in scan velocity which produces a distorted image of the text.

Therefore, a narrative but quite comprehensive description of the program/algorithm is also given here.

Briefly; the program detects the onset of a leading edge of a character in the advanced discrete detector element 30. The number of scans that exist between this event and the event of detecting the onset of the same leading edge by the corresponding registered linear array element (#58 for the case of the scanpen device already tested) is established. The comparison of that experimental number of scans as compared to the required "precise image" number of scans (64 for the present case) then permits the orderly elimination of scans on a regular proportional basis so that the remaining scans produce a faithful image of the text. The next paragraph gives the narrative version of the computer algorithm flow chart specifically for the case where scans must be deleted in an orderly manner. A similar algorithm has been written for the case that additional scans must be added in a similarly ordered manner for accurate image representation when the scan has been produced at too fast a scan rate.

The virtual encoder (VE) always views the text at an advanced position relative to the main array (MA). This advanced distance requires a set number of scans for true image presentation; this number of scans is designated as VAL. The program must recognize a light-to-dark transition in VE (0→1), note that scan number (scan number N), and subsequently identify the same (0→1) transition in the MA at element number MA-R, which is the MA element in exact horizontal registration with VE.

At the start of processing of a text segment:

START

IF (EOF) then STOP

1. Set ctr = 0, ctr1 = 0, ctr2 = 0, note the scan number in the file = N.
2. Read a scan.
3. If ctr = 0 and VE = 1 (already black) . . . . . . . . . add 1 to ctr1 and ctr2. GoTo 2.
4. If ctr = 0 and VE = 0 (has turned white) . . . set ctr = 1, add 1 to ctr1 and ctr2. GoTo 2.
5. If ctr = 1 and VE = 0 (still white) . . . . . . . . . . add 1 to ctr1 and ctr2. GoTo 2.
6. If ctr = 1 and VE = 1 (transition to black) . . . . . . . . . . set ctr = 2. GoTo 2.
7. If ctr = 2 and MA-R = 1 (black) . . . . . . . . . . . . add 1 to ctr2 only. GoTo 2.
8. If ctr = 2 and MA-R = 0 (has turned white) . . . . . . set ctr = 3 and add 1 to ctr2. GoTo 2.
9. If ctr = 3 and MA-R = 0 (still white) . . . . . . . . . . . . . . . . . . . . . . add 1 to ctr2. GoTo 2.
10. If ctr = 3 and MA-R = 1 (transition to black) . . . . . . . . . . . this represents the end of the processing segment and the routine branches out to perform the image correction based on the information contained in VAL, N, ctr1, and ctr2. GoTo 11.

-continued

| IF (EOF) then STOP |
|---|

11. If (ctr2 − ctr1) > VAL (the number of scans required for accurate imaging) then some scans must be eliminated to provide a faithful image.
    The following procedure is to be applied for data scans number N to N + ctr2.
    a. Set variables Correct = 0; Int_Correct = 0 (integer part of Correct); old_Int_Correct = 0.
    b. set VV = VAL/(ctr2 − ctr1), . . . . . . . this value is less than 1.
    c. Correct = Correct + VV.
    d. Int_Correct = Integer part of Correct.
    e. If Int_Correct = old_Int_Correct . . . . . . . . . . . . . . . . . . . .
       remove this scan from the data , , , , , ,shift all remaining scans down to lower address by 1 and reduce (N + ctr2) by 1.
    f. If Int_Correct = old_Int_Correct + 1 . . . . . . . . . . . . . . . .
       keep this scan , , , , , , , set old_Int_Correct = Int_Correct , , , , , , , , , , , , , ,
       at end of segment:
            GOTO START As noted for other segments of the software that has been already developed by the inventors, there are other methodologies that could provide the properly corrected text image if such programs were to be provided with the virtual encoder information as disclosed in this document.

This processed image is then formatted for presentation to an OCR program for reduction of the text image to ASCII code representation. By "formatted" it is meant that the finalized bitmap image is given the appropriate file header so that the selected OCR program can process the information directly. With a text image processed according to the methodologies outlined here, there are several readily available OCR programs that are capable of accurately analyzing the data and providing the appropriate ASCII encoded text.

What we claim is:

1. An apparatus for optically detecting an optical pattern which resides on a substrate comprising:
   a. a housing, said housing being moveable relative to said substrate in a scanning direction;
   b. an optical detector means, located within said housing, for detecting the intensity of light reflected from or scattered from a plurality of points of said pattern as said housing is moved relative to said substrate said detector including at least 2 detector elements: and
   c. an optical means which causes a single point of said substrate, which is selected to be a designated position relative to said plurality of points detected by said optical detector means, to be imaged onto a specific one of said detector elements.

2. An apparatus, according to claim 1, wherein said intensity of light scattered from or reflected from said substrate to said optical detector means is transferred via a flat, registered array of optical fibers; a certain subgroup of said fiber array being separated from said fiber array and positioned so as to provide said optical means.

3. An apparatus, according to claim 2, wherein said registered fiber array set is composed of optical fibers having an approximate diameter between 1 micrometer and 500 micrometers.

4. An apparatus, according to claim 2, wherein the end of said registered fiber array nearest to said substrate is cut and polished at a specified angle, so that said scanner housing may be positioned at a specified angle when said housing is moved relative to said substrate.

5. An apparatus, according to claim 1, wherein the face of said registered fiber array closest to said optical detector means is cut off and polished at an angle which is perpendicular to the main axis of said registered optical fiber array.

6. An apparatus, according to claim 5, wherein a lens is positioned at an intermediate position between said end of said optical fiber array nearest to said optical detector means and said optical detector means, for the purpose of focusing said light upon said optical detector means.

7. An apparatus, according to claim 5, wherein said end of said optical fiber array nearest to said optical detector means is contacted directly to said optical detector means.

8. An apparatus, according to claim 4, wherein said end of said optical fiber array nearest to said substrate is positioned remotely from said substrate and a second focusing lens is positioned at an intermediate position between said substrate and said optical fiber array for the purpose of focusing said plurality of substrate points onto said fiber array.

* * * * *